United States Patent [19]

Fontana et al.

[11] Patent Number: 5,568,335
[45] Date of Patent: Oct. 22, 1996

[54] MULTI-LAYER GAP STRUCTURE FOR HIGH RESOLUTION MAGNETORESISTIVE READ HEAD

[75] Inventors: Robert E. Fontana; Hugo A. E. Santini, both of San Jose, Calif.

[73] Assignee: International Business Machines Corporation, Armonk, N.Y.

[21] Appl. No.: 366,277

[22] Filed: Dec. 29, 1994

[51] Int. Cl.$^6$ .................................................. G11B 5/127
[52] U.S. Cl. ............................................................. 360/113
[58] Field of Search ............................ 360/113; 324/252, 324/207.12; 338/32 R

[56] References Cited

U.S. PATENT DOCUMENTS

| Re. 34,099 | 10/1992 | Krounbi et al. | 360/113 |
|---|---|---|---|
| 5,212,609 | 5/1993 | Yuito et al. | 360/113 |
| 5,241,439 | 8/1993 | Michalek et al. | 360/113 |
| 5,264,980 | 11/1993 | Mowry et al. | 360/113 |
| 5,272,582 | 12/1993 | Shibata et al. | 360/113 |
| 5,296,987 | 3/1994 | Anthony et al. | 360/113 |
| 5,311,385 | 5/1994 | Schwarz et al. | 360/113 |
| 5,327,313 | 7/1994 | Nishioka et al. | 360/113 |
| 5,331,493 | 7/1994 | Schwarz | 360/113 |
| 5,337,203 | 8/1994 | Kitada et al. | 360/113 |
| 5,350,629 | 9/1994 | Chaug et al. | 360/113 |
| 5,371,643 | 12/1994 | Yuito et al. | 360/113 |
| 5,375,022 | 12/1994 | Gill et al. | 360/113 |
| 5,434,826 | 7/1995 | Ravipati et al. | 360/113 |
| 5,436,777 | 7/1995 | Soeya et al. | 360/113 |

FOREIGN PATENT DOCUMENTS

58-220240 12/1983 Japan .
4-188418 7/1992 Japan .

*Primary Examiner*—John H. Wolff
*Assistant Examiner*—Brian E. Miller
*Attorney, Agent, or Firm*—Baker, Maxham, Jester & Meador

[57] ABSTRACT

A method of constructing a narrow gap magnetoresistive (MR) read head is provided which prevents shorting between lead layers and shield layers. This is accomplished by a two-step process of depositing first gap layers before an MR sensor is deposited and a two-step process of depositing second gap layers after the MR sensor is formed. A very thin first gap layer is deposited on a first shield layer. A first MR region is then masked and a first gap pre-fill layer is deposited. The mask is lifted off leaving the first gap pre-fill layer everywhere except in the first MR region. An MR sensor and first and second leads are formed by various novel arrangements resulting in contiguous junctions or continuous spacer junctions therebetween. After completion of the MR sensor and leads, a very thin second gap layer is deposited. A second MR region, which encompasses the MR sensor, is masked and a second gap pre-fill layer is deposited. The mask is then lifted off leaving the second gap pre-fill layer located everywhere except in the second MR region. The result is that very thin first and second gap layers are located in the MR regions below and above the MR sensor to provide the MR head with high linear resolution, and the first gap layer and the first gap pre-fill layer are located between the leads and the first shield layer, and the second gap layer and the second gap pre-fill layer are located between the leads and the second shield layer to prevent shorting between the lead layers and the shield layers.

20 Claims, 7 Drawing Sheets

MULTI-LAYER GAP STRUCTURE FOR HIGH RESOLUTION MAGNETORESISTIVE READ HEAD

CROSS REFERENCE TO RELATED APPLICATION

This invention is related to an invention entitled "Magnetoresistive Read Head With Back-Filled Gap Insulation Layer(s)" filed in a commonly assigned application, Ser. No. 08/065,098, by Chen et al. on May 18, 1993, which application is incorporated by reference herein.

BACKGROUND OF THE INVENTION

1. Field of the Invention

The present invention relates to a narrow gap magnetoresistive (MR) read head and more particularly to an MR read head where gap layers are narrow in an MR sensor region adjacent an air bearing surface (ABS) to provide good resolution and thicker outside of the MR sensor region to provide good insulation between lead layers and first and second shield layers.

2. Description of the Related Art

An MR read head includes an MR sensor which is sandwiched between first and second gap layers G1 and G2 which are in turn sandwiched between first and second shield layers S1 and S2. Lead layers are sandwiched between the first and second gap layers for providing a sense current to the MR sensor. Magnetic fields from a magnetic disk change the resistance of the sensor proportional to the strength of the fields. The change in resistance changes the potential across the MR sensor which is processed by channel circuitry as a readback signal.

An MR read head is typically mounted to a slider which, in turn, is attached to a suspension and actuator of a magnetic disk drive. The slider and edges of the MR sensor and other layers of the read head form an air bearing surface (ABS). When a magnetic disk is rotated by the drive, the slider and one or more heads are supported against the disk by a cushion of air (an "air bearing") between the disk and the ABS. The air bearing is generated by the rotating disk. The read head then reads magnetic flux signals from the rotating disk.

The capability of an MR head to read data recorded at high areal densities is determined by its trackwidth and its resolution. The trackwidth of an MR read head is the length of the active or sensing region for the MR sensor and is typically defined by photolithography and subtractive or additive processing. Resolution is determined by the gap of the read head which is the distance between the first and second shield layers at the ABS. Accordingly, this distance is the total of the thicknesses of the MR sensor and the first and second gap layers. For a 2 gigabit/in$^2$ read head, a typical gap thickness is 200 nm with a sensor thickness of 40 nm. This means that each of the first and second gap layers are 80 nm thick. For a 5 gigabit/in$^2$ head, the total gap thickness can approach as thin as 100 nm.

When the first and second gap layers G1 and G2, which separate the MR sensor from the first and second shield layers S1 and S2, become thinner, the linear resolution of read head becomes higher. A serious limitation on the thinness of the gap layers of the read head is the potential for electrical shorting between the lead layers and the first and second shield layers. The thinner a gap layer, the more likely it is to have one or more pinholes which expose a lead layer to a shield layer. Pinholes can significantly reduce the yield of a production run of MR read heads.

It is important to note that the only place where the gap layers have to be thin is in an MR region where the MR sensor is located. The gap layers can be thicker between the lead layers and the first and second shield layers. Accordingly, it would be desirable if each gap layer could be thin in the MR region to provide high linear resolution and thick outside of the MR region to provide good insulation between the lead layers and the shield layers. In the above mentioned patent application, this is achieved, within limits, by providing a back fill of gap material to the first gap layer to replenish the gap material which is etched away during definition of the MR sensor. After masking by photolithography, the MR sensor is typically trimmed by ion beam milling. The practice is to over etch to ensure that the MR sensor is well formed. The over milling reduces the thickness of the first gap layer all around the MR sensor. In order to allow for this reduced thickness and to ensure that the over milling does not intrude into the first shield layer, the first gap layer is made sufficiently thick. Accordingly, a limitation of the teaching in the above patent application is that the first gap layer must have a thickness between the MR sensor and the first shield layer which is sufficient to prevent milling into the first shield layer when the MR is defined by ion beam milling. After the MR is defined, the thickness of the first gap layer milled away is then filled in by additional gap material which is referred to as "backfill" in the patent application. There is a strongly felt need for a first gap layer thickness in the MR region which is not dependent upon how much the gap layer will be milled away during definition of the MR sensor.

A write head is typically combined with a read head. A write head has first and second pole tips at the ABS. The second pole tip is a critical element of the write head since it is the last pole tip to induce magnetic flux into a rotating magnetic disk. When thin film layers are deposited to form a combined write/read head, the second pole tip is located directly above the MR region. If the MR region is not planar, any unevenness will be replicated into the layer which forms the second pole tip. If side edges of the second pole are not well formed, the trackwidth of the write head gets fuzzy and the write head loses resolution. For instance, when the first and second lead layers are connected to the MR sensor by overlapping junctions, in the read head, steps are formed. The steps are undesirably replicated through the layers to the second pole tip. There is a strongly felt need for a more planar MR region which will allow construction of a high resolution second pole tip in a combined head.

SUMMARY OF THE INVENTION

The present invention provides a method of constructing a narrow gap read head which will not short between lead layers and shield layers and which has a more planar MR region. This is accomplished by a two step process of depositing first gap layers before the MR sensor is deposited and a two step process of depositing second gap layers after the MR sensor is deposited. In the invention a very thin first gap layer G1 is deposited on the first shield layer S1. An MR region is then masked and a first gap pre-fill layer G1P, which may be thicker than G1, is deposited. The mask is removed, leaving the first gap pre-fill layer G1P everywhere except in the MR region. Lead layers L1 and L2 and an MR sensor are formed. Several novel embodiments of this construction are explained in the detailed description. In one embodiment planarization is enhanced in the MR region so that a high resolution second pole tip of a write head can be constructed.

Next, a very thin second gap layer G2 is deposited. The MR region is then masked and a second gap pre-fill layer G2P is deposited. After lifting off the mask, the G2P layer is located everywhere except in the MR region. The result is that very thin G1 and G2 layers are in the MR region at the bottom and top of the MR sensor to provide the MR head with a high linear resolution, the G1 and G1P layers are located between the leads and the first shield layer S1 to prevent shorting between the lead layers and the first shield layer S1, and the G2 and G2P layers are located between the lead layers and the second shield layer S2 to prevent shorting between the lead layers and the second shield layer S2.

An object of the present invention is to provide a read head which has a very narrow gap and yet will not short between lead layers and the first and second shield layers.

Another object is to provide a method of constructing a first gap layer of an MR read head with a thickness which is not dependent upon a reduction in thickness of the first gap layer, under the MR sensor, even when the MR sensor is defined by ion beam milling.

A further object is to provide a method of constructing a narrow gap read head which will not short between lead layers and first and second shield layers.

Still another object is to provide a narrow gap non-shorting read head which has a more planar MR region so that a second pole tip of a combined read/write head can be constructed with good resolution.

Yet another object is to provide a method of making a read head which has very thin first and second gap layers G1 and G2 in an MR region, the first gap layer G1 and a first gap pre-fill layer G1P being between lead layers and a first shield layer S1 and the second gap layer G2 and a second gap pre-fill layer G2P being between the lead layers and a second shield layer S2.

Other objects and advantages of the invention will be appreciated by one skilled in the art upon reading the following specification in light of the accompanying drawings.

DESCRIPTION OF THE PREFERRED EMBODIMENT

Figure 1:
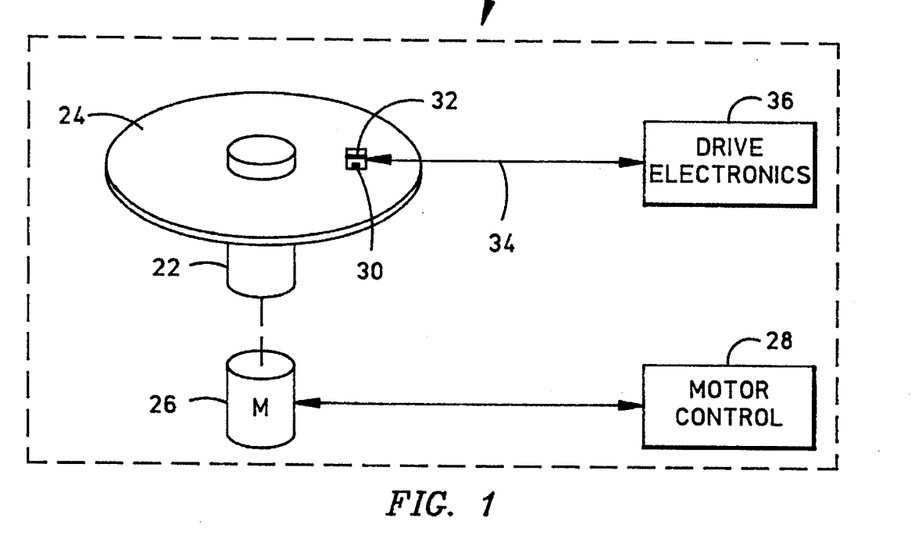
FIG. 1 is a schematic illustration of an exemplary magnetic disk drive.

Referring now to the drawings wherein like reference numerals designate like or similar parts throughout the several views, there is illustrated in FIG. 1 a magnetic disk drive 20. The drive 20 includes a spindle 22 which rotatably supports a magnetic disk 24. The spindle 22 is rotated by a motor 26 which is controlled by motor controls 28. A magnetic head 30, which may be a merged MR head for recording and reading, is mounted on a slider 32 which, in turn, is supported by a suspension and actuator arm 34. The suspension and actuator arm 34 positions the slider 32 so that the magnetic head 30 is in a transducing relationship with a surface of the magnetic disk 24. When the disk 24 is rotated by the motor 26, air is moved by the surface of the disk, causing the slider to ride on an air bearing slightly off of the surface, at a distance in the order of 0.075 microns. The magnetic head 30 is then employed for writing information signals to multiple circular tracks on the surface of the disk 24 as well as reading information therefrom. These information signals as well as servo signals for moving the slider to various tracks are processed by drive electronics 36.

Figure 2:
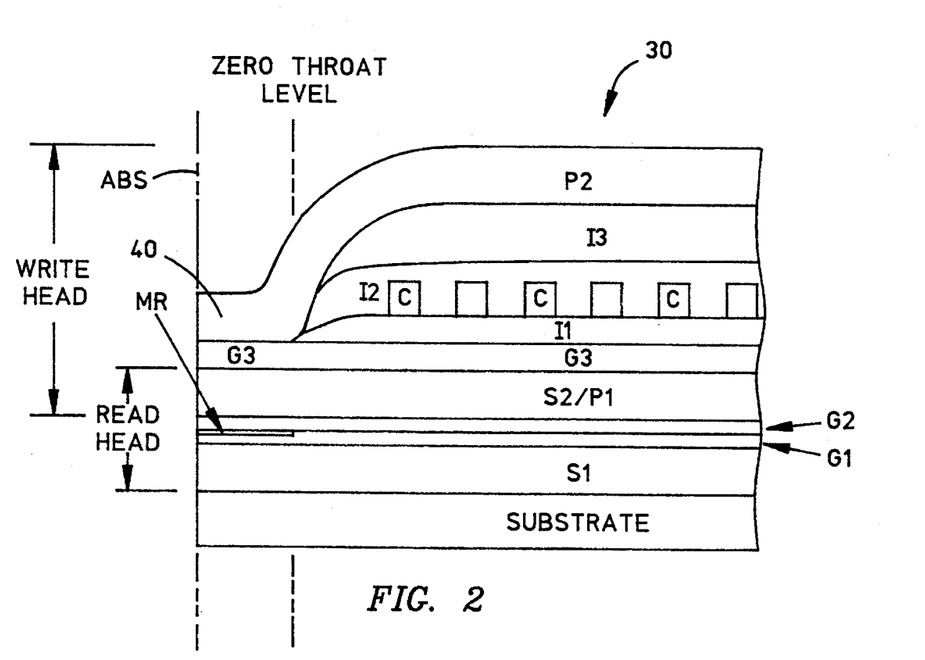
FIG. 2 is a schematic vertical cross section of a merged MR head.
Figure 3A:
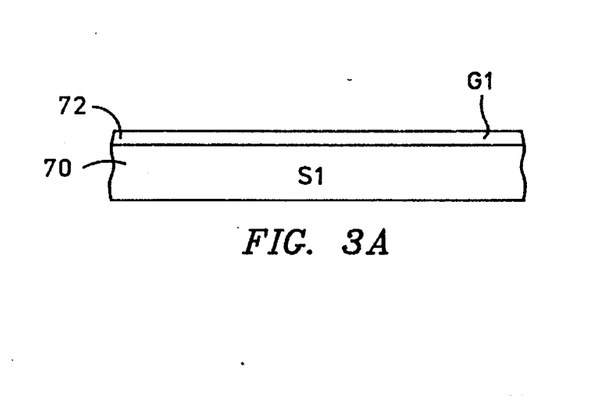
FIG. 3A is an ABS view and FIG. 3B is a top planar view of the step of forming a first gap layer G1 on top of a first shield layer S1 of an MR read head.
Figure 3B:
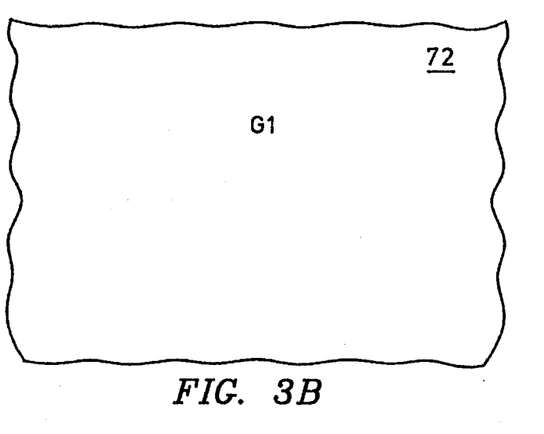

FIG. 2 is a side cross-sectional schematic illustration of the merged MR head 30. In the fabrication of the head, thin film layers are deposited to form an MR read head portion after which additional thin film layers are deposited to form a write head portion which will be described in more detail hereinafter. The read head portion includes an MR sensor which is sandwiched between first and second gap layers G1 and G2 which, in turn, are sandwiched between first and second shield layers S1 and S2. In an MR merged head, the second shield layer S2 of the read head portion serves as the first pole piece P1 of the write head portion. The write head portion includes coils C which are sandwiched between first and second insulation layers I1 and I2 which, in turn, are sandwiched between a gap layer G3 and a third insulation layer I3 which are, in turn, sandwiched between first and second pole pieces P1 and P2. The pole pieces P1 and P2 terminate in pole tips at the air bearing surface (ABS). The pole tips are separated by the gap layer G3 which is referred to as the transducing gap of the write head. Flux signals between the pole tips across this gap write information signals into the circular tracks by magnetizing the surface of the magnetic disk 24. Magnetic fields from the disk change the resistance of the MR sensor. Leads, which will be discussed in more detail hereinafter, conduct a sense current through the MR sensor. This causes a change in potential which is proportional to resistance changes in the MR sensor. Potential changes are then processed by circuitry (not shown) to produce a readback signal.

The ability of the write head to write (i.e., record) data at high areal densities is increased by increasing its track density and linear density (i.e., resolution) at the ABS. Track density is increased by narrowing the width of the second pole tip 40 and linear density is increased by reducing thickness of the gap layer G3. Track widths in the order of submicron and gap thicknesses in the order of 0.2 microns are feasible. In order to be compatible with the write head, the read head should have a track width less than that of the write head and a linear density which is at least equal to the linear density of the write head. The linear density of the read head is determined by the thicknesses of the first and second gap layers G1 and G2 between the shield layers S1 and S2. It is desirable that these layers be as thin as possible without causing shorting problems between leads to the MR sensor and the first and second shield layers S1 and S2. Because of this limitation, the prior art has had to provide first and second gap layers G1 and G2 in the MR sensor region thicker than desired. It is this problem that the present invention has overcome. The present invention applies to merged MR heads, as just described, piggyback MR heads or MR heads per se.

Figure 11A:
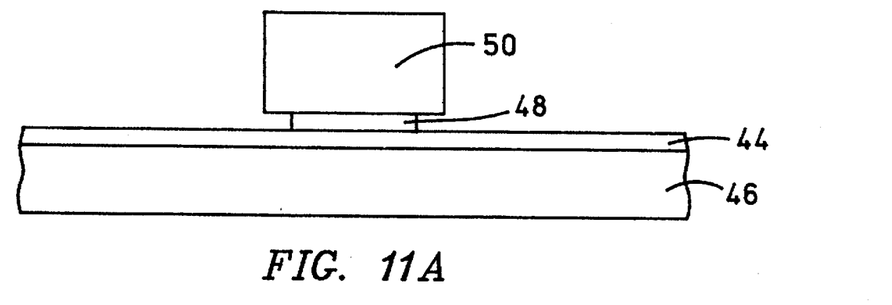
FIGS. 11A, 11B, and 11C are elevation views of forming a feature employing a bi-layer resist masking process and milling.
Figure 11B:
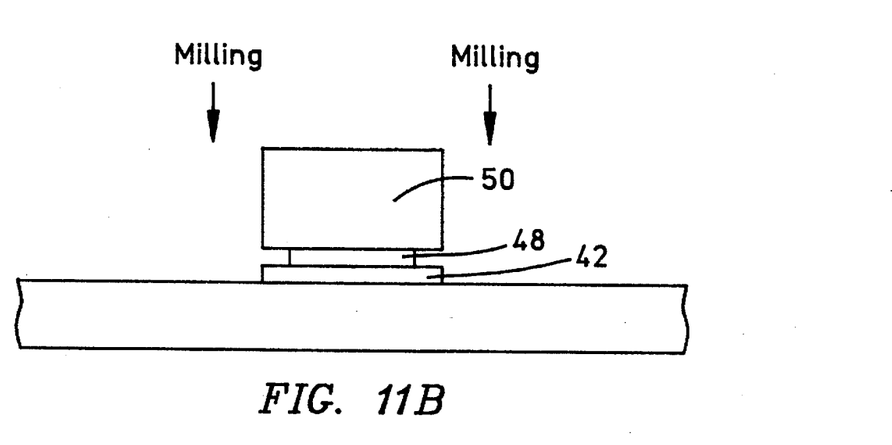
Figure 11C:
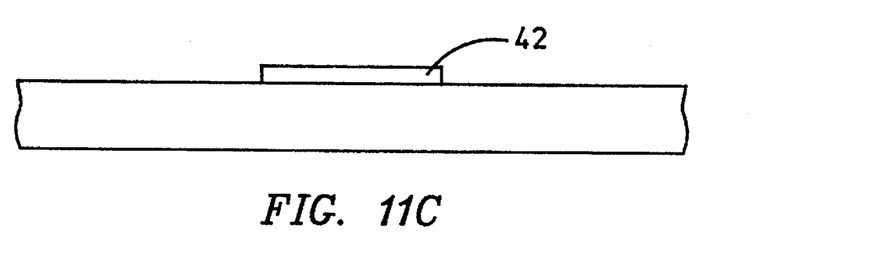

Before describing the construction of the present MR head, several fabrication steps will be described which can be employed for constructing the MR head. FIGS. 11A, 11B, and 11C illustrate the formation of a narrow layer 42, such as an MR sensor, by employing a bi-layer resist mask and milling process steps. FIG. 11A illustrates the step of depositing a thin layer of material 44, such as Permalloy, on a layer 46. The layer 44 may be deposited by sputtering. Next, a thin layer of resist (not shown) is spun on top of the layer 44 and a thick layer of resist (not shown) is spun on top of the thin layer of resist. These photoresist layers are then exposed to light with the desired pattern and dissolved with an etchant. The bottom resist layer is selected to dissolve faster than the top resist layer so that bottom and top photoresist layers 48 and 50 are formed, as shown in FIG. 11A, the thicker photoresist layer 50 overhanging the bottom photoresist layer 48. In FIG. 11B the mask formed by the bottom and top photoresist layers 48 and 50 are employed during milling to remove the thin layer 44 except for a small portion directly under the thick resist layer 50. A solvent is then applied which dissolves the bottom resist layer 48 lifting off both resist layers 48 and 50 and leaving the desired thin layer feature 42 as shown in FIG. 11C.

Figure 12A:
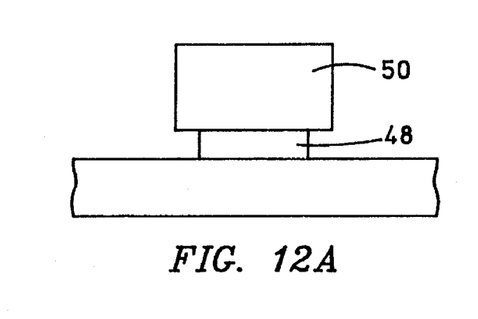
FIGS. 12A, 12B, and 12C are elevation views of forming features employing a bi-layer resist mask and sputtering.
Figure 12B:
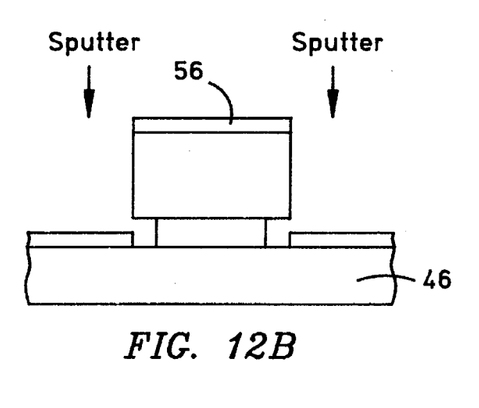
Figure 12C:
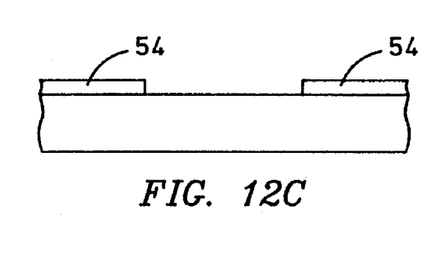

In FIGS. 12A, 12B, and 12C, a similar process is employed as that described in FIGS. 11A, 11B, and 11C except a larger feature 54, such as lead layers, is fabricated. In FIG. 12A the mask comprising resist layers 48 and 50 is formed as described hereinabove. A thin layer of material, such as Permalloy or alumina, may be sputtered on top of the resist layer 50 and the layer 46. The resist layer 48 is then dissolved with a solvent which lifts off the photoresist layers 48 and 50 as well as the layer 56 on top of the resist layer 50. The result is the layers 54 as illustrated in FIG. 12C.

Figure 13A:
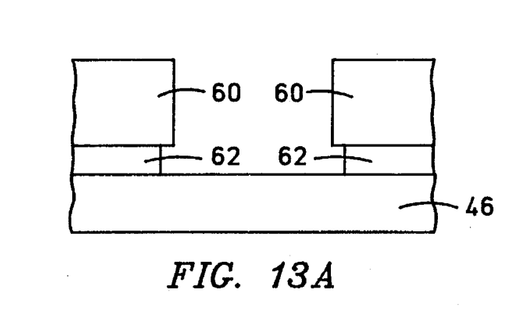
FIGS. 13A, 13B, and 13C are elevation views of the formation of a feature employing a reverse bi-layer resist mask and sputtering.
Figure 13B:
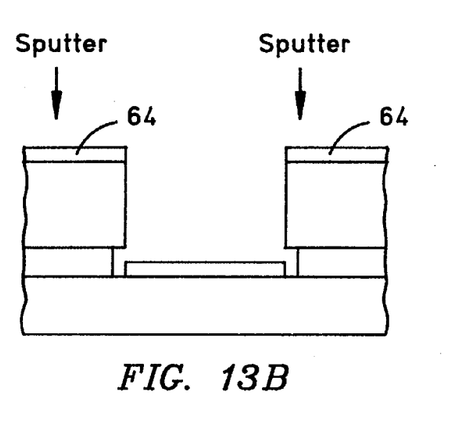
Figure 13C:
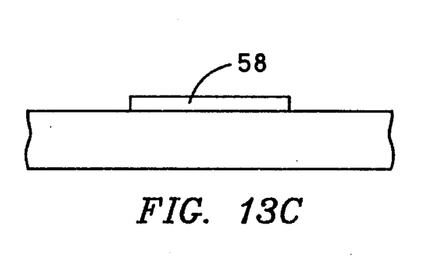

FIGS. 13A, 13B, and 13C illustrate a reverse bi-layer lift off resist process for forming a feature 58, shown in FIG. 13C, which is similar to the feature 42, shown in FIG. 11C. After spinning on a thin bottom resist layer and a top thick resist layer, where the bottom thin resist layer dissolves at a greater rate than the top thick resist layer after exposure to light, a top thick resist layer 60 overhangs a bottom thin resist layer 62. A thin layer is then deposited, such as by sputtering, as illustrated in FIG. 13B. The bottom thin resist layer 62 is then dissolved in a solvent which lifts off the bottom thin resist layer 62, the top thick resist layer 60 and the top sputtered layer 64 leaving the desired feature 58 as shown in FIG. 13C.

FIGS. 3 through 8 illustrate process steps in the formation of various layers of the present MR read head. As shown in FIG. 3A, a first shield layer 70 is formed on top of a substrate (not shown). Next, a first gap layer 72 is formed on top of the first shield layer 70, the gap layer being an insulation material, such as alumina. With the present invention, the gap layer 72 can be made very thin in a first MR region 76 (see FIG. 4B) of the MR sensor. The thickness of the first gap layer 72 is in the order of 80 nm for a 2 gigabit/in$^2$ read head. There is a high probability of pinholes in such a thin gap layer which would cause electrical shorting between subsequently formed lead layers and the first shield layer 70.

Figure 4A:
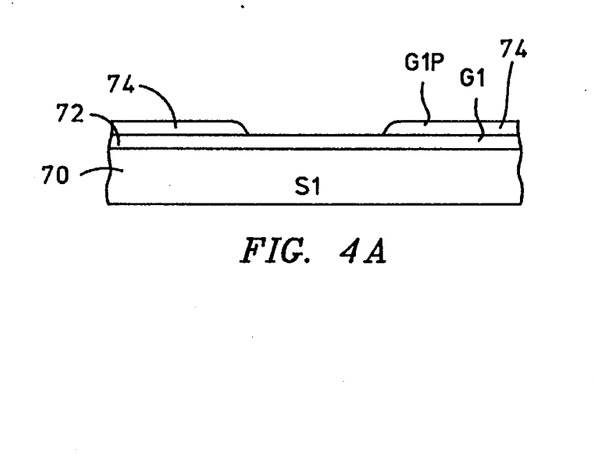
FIG. 4A is an ABS view and FIG. 4B is a top planar view of the formation of a first gap pre-fill layer G1P on top of the first gap layer G1.
Figure 4B:
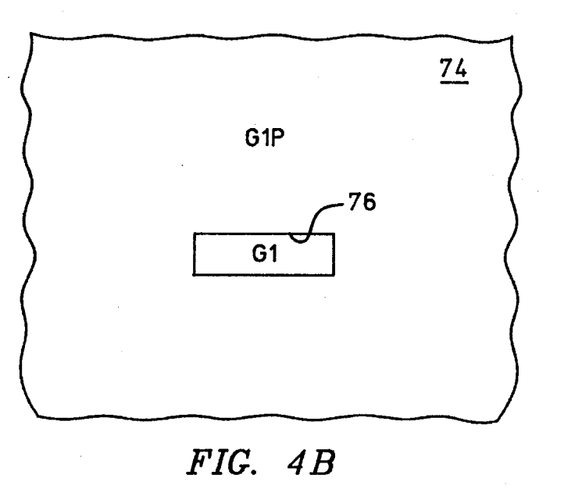

The present invention overcomes the aforementioned shorting problem by forming a first gap pre-fill layer 74 as illustrated in FIGS. 4A and 4B. Like the first gap layer 72, the first gap pre-fill layer 74 is an insulation material, such as alumina. The first gap pre-fill layer 74 is deposited everywhere except in the first MR region 76. Subsequently, the MR sensor will be constructed in the first MR region 76 which will be described in detail hereinafter. The masking and formation of the first gap pre-fill layer 74 may be accomplished by the process steps illustrated in FIGS. 12A, 12B, and 12C.

Figures 5A, 5B, 6A, 6B:
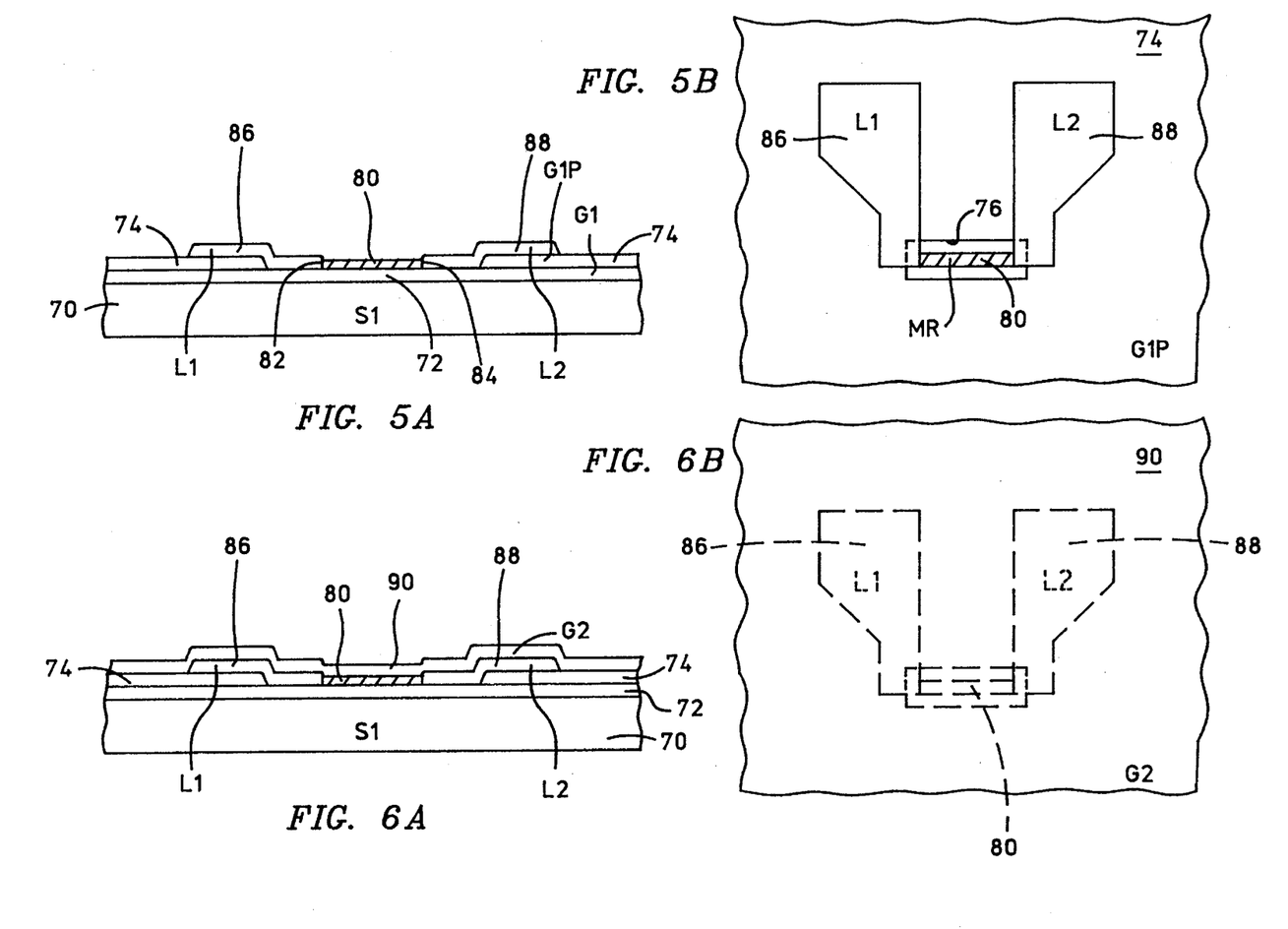
FIG. 5A is an ABS view and FIG. 5B is a top planar view of the formation of an MR sensor and first and second lead layers L1 and L2.
FIG. 6A is an ABS view and FIG. 6B is a top planar view of the formation of the second gap layer G2 of an MR read head.

A layer of MR material, such as Permalloy, may be then formed everywhere (not shown). The MR layer is then masked (not shown) and ion milled to form receptacles for receiving first and second leads L1 and L2. These receptacles (not shown) have the same shape as the first and second lead L1 and L2 of FIG. 5B. The leads L1 and L2 are then formed in the receptacles in the MR material. At this stage of the processing there is a region of MR material about the leads L1 and L2. It is now necessary to define the MR sensor 80. Photoresist is formed in the shaded area 80 and on leads 86 and 88 of FIG. 5B and all the rest of the MR material is ion milled away leaving the MR stripe 80 with well defined top and bottom edges which define a desired height. This also provides contiguous junctions between the first and second leads L1 and L2 and side edges 82 and 84 respectively of the MR sensor as shown in FIGS. 5A and 5B. The processing now looks like FIGS. 5A and 5B with the first gap prefill layer G1P exposed about the first and second leads L1 and L2 and about the outside of most of the first MR region 76. It should be understood that the first and second leads L1 and L2 may include two layers, the first layer being a bias layer, such as hard magnetic material (CoPtCr, etc.) or antiferromagnetic material (NiMn, MnFe, etc.), for pinning the moment of the MR sensor and a second layer of conductive lead material, such as Ta, Au or W.

In an alternate construction of the leads L1 and L2 and the MR sensor a layer of MR material, such as Permalloy, may be formed everywhere (not shown). The full MR layer may then be processed according to the steps shown in 11A, 11B, and 11C to produce the MR sensor 80 which is illustrated in FIGS. 5A and 5B. In order to improve planarization of the construction of the MR read head in the first MR region 76, side edges 82 and 84 of the MR sensor 80 are milled away so that contiguous junctions can be made with first and second leads 86 and 88 to be subsequently formed. In order to obtain the side edges 82 and 84, it is necessary for the milling step, illustrated in FIG. 11B, to slightly over mill the MR layer to ensure that all of the MR layer is removed except for the MR sensor 80. It will be appreciated that this over milling mills away a top portion of the first gap pre-fill layer 74, however there will be no milling of the MR sensor 80 and thin first gap layer 72 directly below the MR sensor 80 since the masking layer 50 protects the MR sensor and the first gap layer portion from milling. The result is that the first gap layer 72 directly below the MR sensor 80 maintains an exact thickness which is desirable for establishing a very narrow gap and high resolution for the MR read head. In the design of the gap pre-fill layer 74, it is made sufficiently thick so that a top layer portion of it can be sacrificed during the milling operation shown in FIG. 11B leaving a sufficient remainder thickness which in combination with the first gap layer 72 ensures that no pinholes occur or line up between subsequently formed first and second lead layers 86 and 88 and the first shield layer 70.

Next in the alternate construction of the first and second leads L1 and L2 and the MR sensor 80 is the formation of the first and second lead layers 86 and 88 as illustrated in FIGS. 5A and 5B. By leaving the photoresist layers 48 and 50 in place above the MR sensor 80, and after milling, as shown by 42 in FIG. 11B, a layer of hard bias and/or antiferromagnetic material followed by a lead material, such as Ta, Au or W, may be deposited everywhere. This will cause a good contiguous junction connection between the lead layer and the MR sensor at the edges 82 and 84, as illustrated in FIG. 5A. The photoresist layers 48 and 50 are lifted off and the lead layer can be patterned to produce the first and second lead layers 86 and 88 as shown in FIG. 5B.

After formation of the lead layers L1 and L2 and the MR sensor 80 a very thin second gap layer 90 is deposited everywhere which covers the top of the first MR region 76, the first and second lead layers 86 and 88 and the first gap pre-fill layer 74 as shown in FIGS. 6A and 6B. Again, this second gap layer 90 is made as thin as desired in the first MR region which may be the same thickness as the first gap layer 72 in the first MR region below the MR sensor 80. Because of the teachings of the present invention, the thinness of this second gap layer 90, which may be in the order of 80 nm for a 2 gigabit/in² read head, is made with little chance of shorting between the lead layers 86 and 88 and a second shield layer which is to be subsequently formed. A very thin gap has now been established for the read head as determined by the thicknesses of the first gap layer 72, the MR sensor 80 and the second gap layer 90, as shown in FIG. 6A, and will not be changed by subsequent steps in the formation of the read head.

Figures 7A, 7B, 8A, 8B:
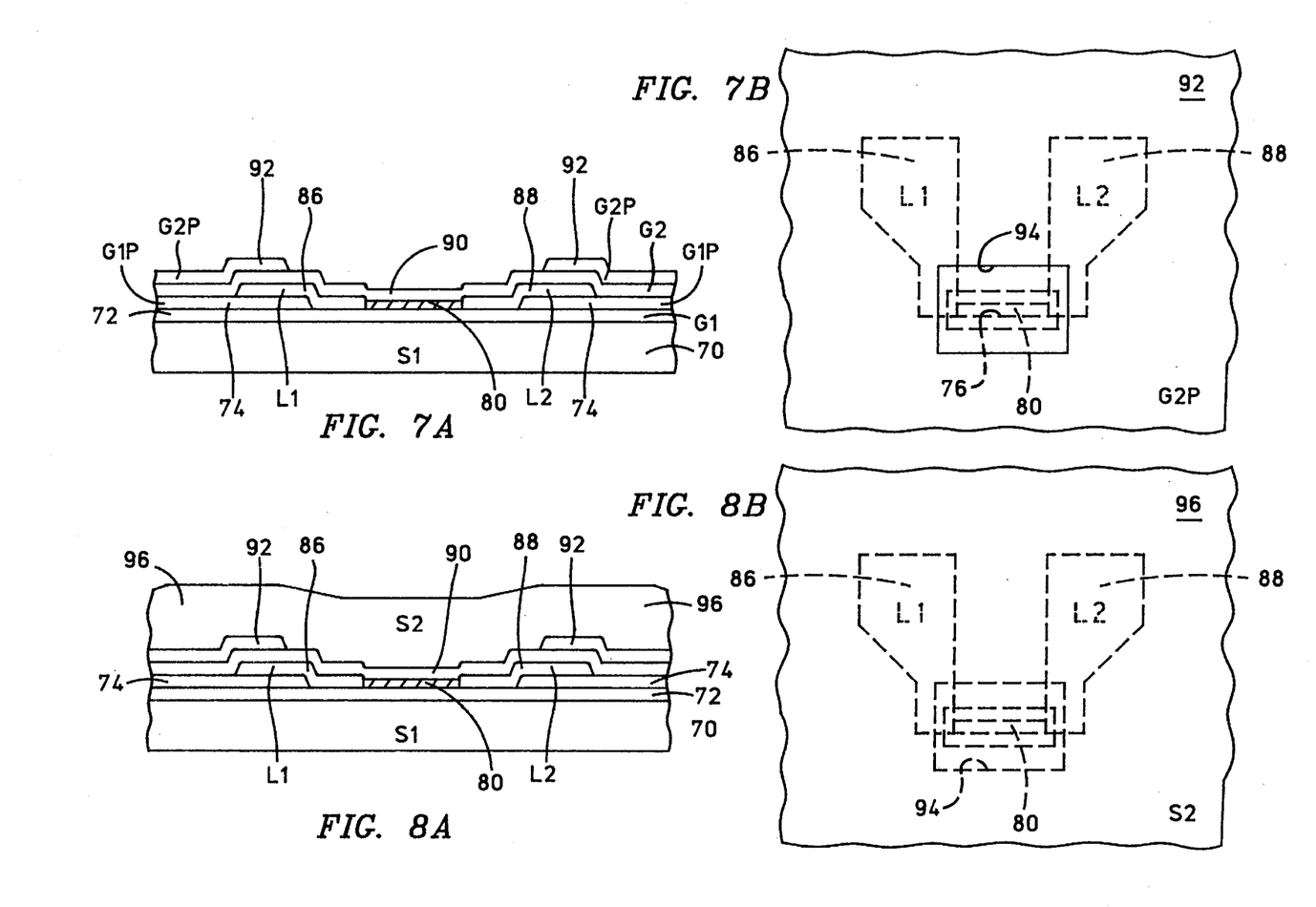
FIG. 7A is an ABS view and FIG. 7B is a top planar view of the formation of a second gap pre-fill layer G2P.
FIG. 8A is an ABS view and FIG. 8B is a top planar view of the formation of the second shield layer S2.

Next a second gap pre-fill layer 92 is formed everywhere except in the MR region 76. In a preferred embodiment of the invention, the second gap pre-fill layer 92 is deposited everywhere except in a second MR region 94 which encompasses and is spaced from all sides of the first MR region 76 as illustrated in FIG. 7B. This insures that the steps caused by the first gap pre-fill layer 74 and the second gap pre-fill layer 92 are not vertically aligned so as to create one giant step in the construction of the head.

Figure 9:
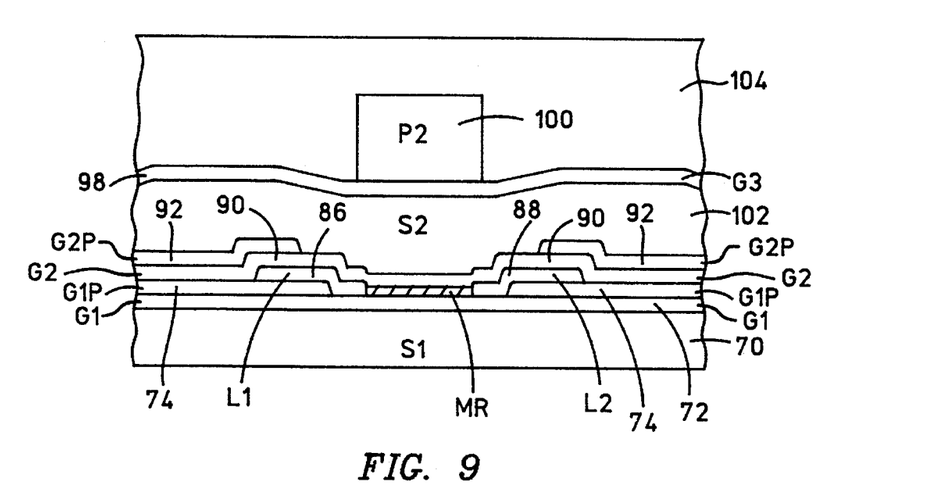
FIG. 9 is an ABS view of the formation of a gap layer G3 and a second pole tip P2 of a write head to comprise a merged MR head.

The next step is to deposit the second shield layer 96 everywhere which covers the top of the second MR region 94 and the gap pre-fill layer 92, as shown in FIGS. 8A and 8B. Next, a gap layer 98 and a second pole tip 100 are formed for the write head as shown in FIG. 9. It should be noted that the read head portion directly below the second pole tip 100, which is essentially the first MR region 76, is substantially planar which enables the construction of a well-formed second pole tip. Accordingly, steps in the read head are not substantially replicated into the configuration of the second pole tip 100. An overcoat layer 104 as well as other layers (not shown) may be formed to complete the merged MR head as illustrated in FIGS. 9 and 2.

Figure 10:
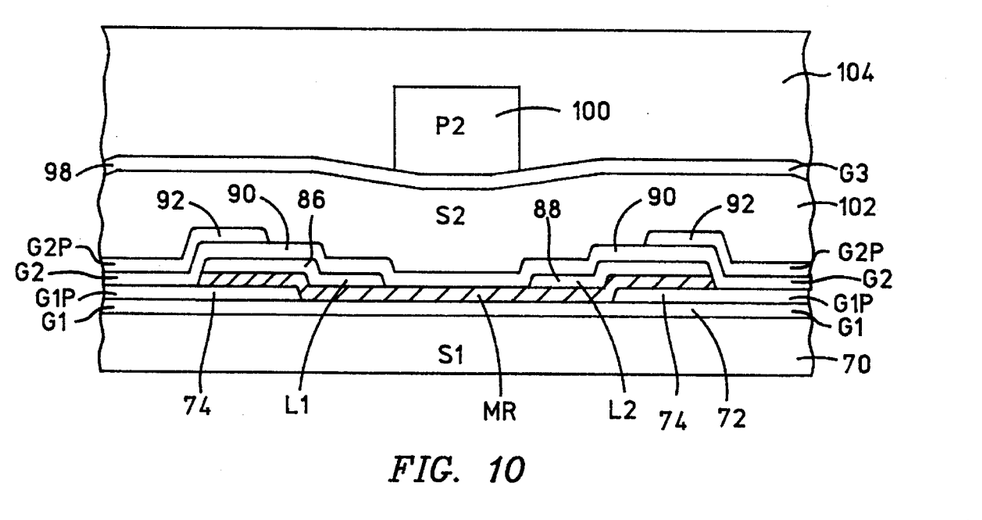
FIG. 10 is an ABS view of an alternate merged MR head with differently constructed leads L1 and L2 and MR sensor.

Another embodiment of the present invention is illustrated in FIG. 10. This embodiment differs from the FIG. 9 embodiment in that the lead layers L1 and L2 and the MR sensor have a different configuration and a different relationship with respect to one another. The method of construction of this embodiment is the same as the FIG. 9 embodiment through the construction of the first gap pre-fill layer G1P as shown in FIGS. 4A and 4B. The difference takes place in the construction of the first and second lead layers L1 and L2. The first step in the construction of the first and second lead layers L1 and L2 and the MR sensor is to deposit a layer of MR material (not shown). The MR layer is then patterned with photoresist to provide receptacles in the photoresist with shapes corresponding to the leads L1 and L2 shown in FIG. 5B. Leads L1 and L2 are then formed in the photoresist receptacles and the photoresist is removed. As explained hereinabove the leads L1 and L2 may comprise two layers, an antiferromagnetic layer and a conductor layer. The lead layers L1 and L2 are now on top of the MR layer, and the next step is to define the MR sensor. This is done by forming photoresist on top of the first and second lead layers L1 and L2 and the MR layer portion which is to be formed into the MR sensor 80. This photoresist takes the shape of L1, L2 and the shaded area 80 in FIG. 5B. The MR layer is then ion beam milled and the photoresist is removed. The result is that the leads L1 and L2 are on top of and make electrical and magnetic contact with large areas of MR layer material which are integral with the MR sensor as shown, in FIG. 10. For this reason this embodiment is referred to as a continuous spacer junction. It has an advantage over the contiguous junction embodiment, shown in FIG. 9, in that the leads are connected over a large surface of the MR material whereas in the FIG. 9 embodiment the leads L1 and L2 are connected to small side edges 82 and 84, as shown in FIG. 9. In the FIG. 10 embodiment the spacing between the leads L1 and L2 at the MR sensor define the track width of the MR sensor. The remainder of the construction of the continuous spacer embodiment, in FIG. 10, is the same as that described hereinabove for the contiguous junction embodiment, shown in FIG. 9.

In either embodiment (FIG. 9 or FIG. 10) the MR sensor is sandwiched between very thin first and second gap layers 72 and 90 at the ABS for establishing a very narrow gap for the read head which may be combined with a high resolution write head as illustrated in FIGS. 2, 9 and 10. Since these first and second gap layers are too thin to maintain electrical integrity between the lead layers and the first and second shield layers, the invention provides pre-fill first and second gap layers which substantially eliminate any shorting between the lead layers and the shield layers. Further, by employing double layers between the lead layers and shield layers, namely a first gap layer and a first gap pre-fill layer between the lead layers and the first shield layer and a second gap layer and a second gap pre-fill layer between the lead layers and the second shield layer any pinholes will most likely be offset so as to prevent shorting between the lead layers and the shield layers.

It should be understood that other process steps other than those described in FIGS. 11, 12, and 13 may be employed in the construction of the MR read head. Further, it should be understood that the MR sensor may be laminated with other layers to provide the desired transverse biasing of the MR sensor. Still further, the lead layers may be laminated so that a hard biasing layer is adjacent each edge of the MR sensor for longitudinally biasing the MR sensor to stabilize its domains and prevent Barkhausen noise. All metal layers may be deposited by sputtering, vacuum deposition or plating. The insulation layers, which are the first and second gap layers, the first and second gap pre-fill layers and the gap layer for the write head may be deposited by sputtering. The material of the insulation layers may be aluminum oxide. The material for the MR sensor may be Permalloy which is nickel iron and the material for the lead layers may be copper.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A narrow gap magnetoresistive (MR) read head which has an air bearing surface which extends laterally along a track width of the read head, comprising:

a substantially flat first insulative gap layer which has a substantially uniform thickness;

an MR sensor located on top of the first insulative gap layer, the MR sensor having an active MR region which extends laterally with opposite ends to define said track width;

a first insulative gap pre-fill layer on top of the first insulative gap layer and having an opening surrounding said active MR region;

first and second lead layers located on top of the first insulative gap pre-fill layer and connected to the MR sensor;

a second insulative gap layer located on top of the first insulative gap pre-fill layer so as to be over the first and second leads and the active MR region within said opening; and a second insulative gap pre-fill layer located on top of the second insulative gap layer so as to be over the first and second leads and having an opening surrounding said active MR region, whereby the first and second insulative gap layers establish a narrow gap high resolution for the MR read head at the active MR region and the first and second insulative gap pre-fill layers provide insulation for the leads in addition to the first and second insulative gap layers laterally beyond said active MR region.

2. A narrow gap MR read head as claimed in claim 1 including:

the MR sensor being a thin film which is bounded by first and second side edges and top and bottom edges, the bottom edge forming a portion of the air bearing surface; and the first and second lead layers having side edges which directly engage the first and second side edges of the MR sensor to make contiguous junctions therewith.

3. A narrow gap MR read head as claimed in claim 1 including:

said active MR region being bounded in part by first and second inactive MR regions; and the first and second lead layers being deposited on the first and second inactive MR regions respectively to provide a continuous spacer junction with the MR sensor.

4. A magnetic media drive including the MR head as claimed in claim 1, the drive comprising:

a housing;

a support mounted in the housing for supporting the MR head;

moving means mounted in the housing for moving a magnetic medium past the head;

positioning means connected to the support for moving the head to multiple positions with respect to said moving magnetic medium so as to process signals with respect to multiple tracks on the magnetic medium; and control means connected to the MR head, the magnetic medium moving means and the positioning means for controlling and processing signals with respect to the MR head, controlling movement of the magnetic medium and controlling the position of the MR head.

5. An MR read head as claimed in claim 1 including:

first and second shield layers;

the first insulative gap layer, the first insulative gap pre-fill layer, the MR sensor, the first and second lead layers, the second insulative gap layer and the second insulative gap pre-fill layer being sandwiched between the first and second shield layers.

6. A combined head including the MR read head as claimed in claim 1, the combined head including:

a write head on top of the second shield layer.

7. A combined head including the MR read head as claimed in claim 5, the combined head including:

a write head which includes a first pole piece which has a first pole tip at the air bearing surface, and a second pole piece which has a second pole tip at the air bearing surface the second pole piece being on top of the first pole piece and the second pole tip being on top of the first pole tip but separated therefrom by a gap at the air bearing surface;

the first pole piece comprising the second shield layer; and the second pole tip being located substantially laterally within the active MR region at the air bearing surface.

8. A magnetic media drive including the combined head as claimed in claim 7 the drive comprising:

a housing;

a support mounted in the housing for supporting the merged MR head;

moving means mounted in the housing for moving a magnetic medium past the head; positioning means connected to the support for moving the merged MR head to multiple positions with respect to a moving magnetic medium so as to process signals with respect to multiple trucks on the magnetic medium; and control means connected to the merged MR head, the magnetic medium moving means and the positioning means for controlling and processing signals with respect to the merged MR head, controlling movement of the magnetic medium and controlling the position of the merged MR head.

9. A narrow-gap magnetoresistive (MR) read head which has a laterally extending air bearing surface comprising:

a first insulative gap layer;

an MR sensor on top of the first insulative gap layer, the MR sensor having an active MR region which extends laterally with opposite ends to define a track width of the read head;

a first insulative gap pre-fill layer on top of the first insulative gap layer but not on top of said active MR region;

first and second lead layers on top of the first insulative gap pre-fill layer and connected to the MR sensor so as to establish said active MR region;

a second insulative gap layer on top of the active MR region, on top of the first insulative gap pre-fill layer and above the first and second lead layers;

a second insulative gap pre-fill layer on top of the second insulative gap layer and over said leads but not on top of said active MR region; and said second insulative gap pre-fill layer having an opening which surrounds the active MR region, whereby the first and second insulative gap layers establish a narrow gap high resolution for the MR read head at the active MR region and the first and second insulative gap pre-fill layers provide insulation for the leads in addition to the first and second insulative gap layers laterally beyond said active MR region.

10. A magnetic media drive including the MR head as claimed in claim 9, the drive comprising:

a housing;

a support mounted in the housing for supporting the MR head;

moving means mounted in the housing for moving a magnetic medium past the head;

positioning means connected to the support for moving the head to multiple positions with respect to said moving magnetic medium so as to process signals with respect to multiple tracks on the magnetic medium; and control means connected to the MR head, the magnetic medium moving means and the positioning means for controlling and processing signals with respect to the MR head, controlling movement of the magnetic medium and controlling the position of the MR head.

11. An MR read head as claimed in claim 9 including:

a write head, which has a second pole tip, on top of the second insulative gap pre-fill layer and the second insulative gap layer; and said second pole tip being located above the first and second insulative gap layers but not above the first and second insulative gap pre-fill layers.

12. An MR read head as claimed in claim 9 including:

the first and second lead layers making first and second contiguous junctions respectively with said MR sensor.

13. An MR read head as claimed in claim 9 including:

the first and second lead layers making first and second continuous spaced junctions respectively with said MR sensor.

14. An MR read head as claimed in claim 9 including:

the first insulative gap pre-fill layer being located laterally inwardly with respect to the second insulative gap pre-fill layer, whereby step projections of the first and second insulative gap pre-fill layers are laterally offset.

15. An MR read head as claimed in claim 14 including:

a write head, which has a second pole tip, on top of the second insulative gap pre-fill layer and the second insulative gap layer; and said second pole tip being located above the first and second insulative gap layers but not above the first and second insulative gap pre-fill layers.

16. An MR read head as claimed in claim 15 including:

first and second shield layers; and the first insulative gap layer, the first insulative gap pre-fill layer, the MR sensor, the first and second lead layers, the second insulative gap layer and the second insulative gap pre-fill layer being sandwiched between the first and second shield layers.

17. A combined head including the MR read head as claimed in claim 16, the combined head including:

a write head which includes a first pole piece which has a first pole tip at the air bearing surface and a second pole piece which has a second pole tip at the air bearing surface, the second pole piece being on top of the first pole piece and the second pole tip being on top of the first pole tip but separated therefrom by a gap at the air bearing surface;

the first pole piece comprising the second shield layer; and said second pole tip being located above the first and second insulative gap layers but not above the first and second insulative gap pre-fill layers.

18. An MR read head as claimed in claim 17 including:

the first and second lead layers making first and second contiguous junctions respectively with said MR sensor.

19. An MR read head as claimed in claim 17 including:

the first and second lead layers making first and second continuous spaced junctions respectively with said MR sensor.

20. A magnetic media drive including the combined head as claimed in claim 17; the drive comprising:

a housing;

a support mounted in the housing for supporting the merged MR head;

moving means mounted in the housing for moving a magnetic medium past the head;

positioning means connected to the support for moving the merged MR head to multiple positions with respect to a moving magnetic medium so as to process signals with respect to multiple tracks on the magnetic medium; and control means connected to the merged MR head, the magnetic medium moving means and the positioning means for controlling and processing signals with respect to the merged MR head, controlling movement of the magnetic medium and controlling the position of the merged MR head.

* * * * *